Patented June 5, 1928.

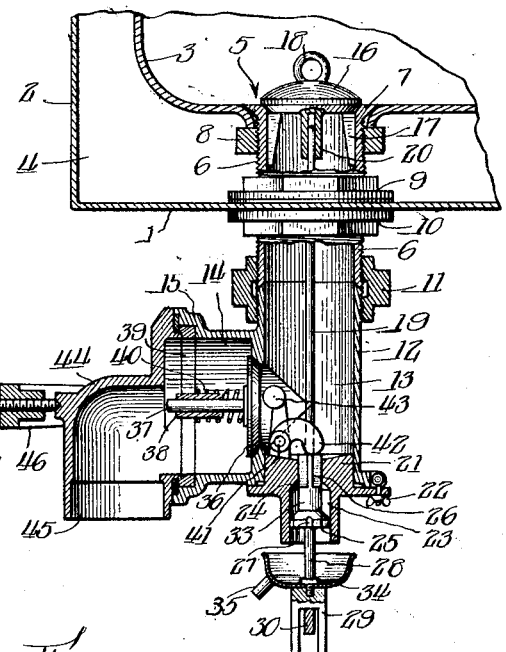

1,672,223

UNITED STATES PATENT OFFICE.

OLAF LARSEN, OF FORT ATKINSON, WISCONSIN, ASSIGNOR TO THE CREAMERY PACKAGE MFG. COMPANY, OF CHICAGO, ILLINOIS, A CORPORATION OF ILLINOIS.

VALVE.

Application filed July 10, 1926. Serial No. 121,531.

The invention relates to valves for the control of the flow of edible fluids, and known as sanitary valves.

In the preparation of milk for food consumption, one of the processes employed is Pasteurization, by which the pathogenic bacteria are destroyed. The common method of Pasteurization is to hold quantities of milk at a pre-determined temperature for a pre-determined time in insulated or heated containers of large capacity. The milk is ordinarily treated in successive batches, the containers being filled and emptied through sanitary piping controlled by sanitary valves positioned at the inlets and outlets of the containers. It will be obvious that any leakage or failure in these valves will permit the uncontrolled flow through the container of a quantity of milk which has not been held for the required time at the necessary temperature. If such leakage is permitted to pass into the discharge conduits with the properly Pasteurized milk, the latter is in danger of reinoculation by the undestroyed bacteria in the milk which has escaped the prescribed treatment.

Also it is obviously necessary that all containers, piping and controlling valves used in the treatment of milk for food consumption be kept in a sanitary condition. This requires that such apparatus be constructed so that the parts may be readily disassembled for thorough cleaning after their operative use.

It is the principal object of this invention to provide an improved sanitary valve which is constructed to direct outwardly from the main passages any leakage occurring in the valve when it is in closed position, and especially adapted to wholly drain the valve chamber of such leakage when operating on a substantially vertical axis as when controlling a downwardly opening outlet. A further object is to provide a valve of simple construction having few parts which may be conveniently and quickly taken down for cleaning.

Other objects and advantages will be apparent in the following detailed description of a preferred embodiment of the invention which I have selected for illustration in the accompanying drawings. It will be understood, however, that various changes in form, construction and arrangement may be made by those skilled in the art without departing from the scope and spirit of the invention as expressed in the appended claims.

Referring to the drawings, Fig. 1 is a sectional side elevation of the valve and Fig. 2 is a front elevation of the same. The reference numerals 1 and 2 indicate the bottom and side walls respectively of a tank, within which and spaced therefrom is a milk container 3 adapted to receive batches of milk for Pasteurization treatment. The intervening space 4 is provided for a heating medium, usually hot water. An outlet opening 5 is provided in the bottom wall of the container 3, within which is positioned a tube 6 preferably having an outwardly flared upper end 7 bearing upon the margin of the container wall about the outlet opening to provide a smooth junction therewith. The tube 6 is secured in position by means of a nut 8 threaded upon the tube and bearing upon the underside of the container wall.

The tube 6 extends through the bottom wall 1 of the holder tank, and is preferably secured in sealed relation thereto by a pair of flanged nuts 9 and 10, also threaded upon the tube 6 and bearing upon the upper and lower surfaces of the tank wall 1 with suitable gaskets therebetween. The threaded lower end of the tube 6 carries a union nut 11 by means of which a casing 12 is detachably secured to the tube 6. The casing 12 is provided with a chamber 13 opening upwardly in communication with the passage through the tube 6, and opening laterally into a passage 14 formed in a lateral extension 15 of the casing.

The tube 6 forms the discharge outlet for the container 3, and is controlled at its upper end by a valve 16 having its seat in the end of the tube 6 and preferably provided with depending guide wings 17 extending into the tube 6 in sliding engagement with the interior surface thereof. A ring 18 may be provided on the upper surface of the valve 16 for the purpose of lifting the latter out of its seat for cleaning.

The valve 16 is preferably operated from below by means of a rod 19 extending into an axial hub 20 formed on the under surface of the valve 16 and arranged for axially sliding engagement therein, so that there may be substantial upward movement of the rod within the hub before the end of the rod engages the valve to lift it from its seat.

The casing 12 is preferably constructed with an open lower end of the chamber 13 into which is removably fitted a closure plug 21, having a flanged lower end abutting the end of the casing and secured in position as by eye bolts and nuts 22. The upper surface of the plug 21 forms the bottom of the chamber 13, and is radially inclined inwardly to form a sump for the accumulation of any leakage, at the center of which opens a passage 23 extending down through the plug for the discharge of any accumulated leakage. The upper surface of the plug 21 is preferably positioned below the lower margin of the lateral opening into the passage 14.

The leakage discharge passage 23 is formed with an enlarged lower portion forming an intermediate shoulder 24. The passage is controlled by a valve 25 adapted to be seated upon the intermediate shoulder 24 and provided with upwardly extending guide wings 26 extending through the constricted upper portion of the passage 23. The periphery of the valve 25 may also have guiding engagement with the enlarged lower portion of the passage and have spaced recesses 27 provided for the escape of the liquid about the valve. A depending stem 28 is provided at the lower end of the valve 25 for the operation of the latter, and preferably carries at its lower end a bearing yoke 29 between the arms of which extends one end of an operating lever 30, centrally pivoted on a bracket 31 supported upon the casing 12, the opposite end of the lever being connected with an operating rod 32, which is controlled by suitable mechanism (not shown) for the periodic operation of the valve.

The rod 19, by which the container outlet valve 16 is operated, is fixed at its lower end in the upper portion of the leakage passage valve guide wings 26, and by reason of the axial play between the rod 19 and the outlet valve 16, the leakage valve 25 is lifted into position to close the latter passage before the continued operation of the leakage valve and the rod 19 effects the lifting of the outlet valve 16. To more effectively accomplish this end it is preferable that the lower section 33 of that portion of the leakage valve which enters the constricted portion of the passage be of full diameter and enter the passage before the outlet valve 16 is lifted. The stem 28 may also carry a leakage receiving cup 34 having a laterally opening discharge spout 35 adapted to direct the leakage into a suitable container.

The lateral opening from the chamber 13 to the passage 14 is also valve controlled, there being a valve 36 outwardly seated upon the margin of the opening and having a supporting stem 37 operatively carried in the hub 38 of a spider 39 supported in a recess formed in the end portion of the lateral extension 15 of the casing. A spring 40 mounted between the spider 39 and the valve 36 normally tends to hold the valve in closed position. A bell crank having pivotal support at 41 upon a lug formed on the upper surface of the plug 21, is positioned with one arm 42 extending across and above the upper end of the leakage valve guide wings 26, and the other arm 43 extending adjacent the inner face of the lateral outlet valve 36. In the upward movement of the leakage valve 25, the bell crank is operated to move the lateral outlet valve 36 away from its seat so that the latter valve is opened and closed in cycle with the opening and closing of the container outlet valve 16.

The casing lateral extension 15 further supports a shell 44 forming a conduit for the liquid discharged through the passage 14, and is provided with a recessed flange 45 adapted to receive the end of suitable sanitary piping for conducting away the treated liquid. As illustrated herein the shell 44 is held in normal position by means of a yoke 46 removably engaging the flanged end of the extension 15 and carrying a threaded hand-operated stem 47 bearing upon the shell 44 and securing it in position abutting the outer end of the extension 15.

From the foregoing description it will be obvious that when the main liquid passage is closed with the tank outlet valve 16 and casing chamber outlet valve 36 seated, the leakage passage valve 25 is open, thus providing for the diversion through the leakage passage of any liquid passing the container valve 16 while the latter is in closed position; also that in the operation of opening the main passage valves the leakage passage valve is first closed so that none of the liquid is wasted in the normal discharge of the treated liquid through the valve structure.

I claim as my invention:

1. A device of the class described, comprising a casing having a chamber with an inlet opening and an oppositely positioned leakage passage in substantial alinement therewith and with an outlet opening positioned laterally thereto, a valve operatively controlling said inlet opening, a valve operatively controlling said passage, a member connecting said passage valve with said inlet valve in such relation that the closing of said passage valve effects the opening of said inlet valve, a valve controlling said outlet opening, and means operable by the closing movement of said passage valve to effect the opening of said outlet valve, said inlet and outlet valves being operable to close said inlet and outlet openings respectively when said passage valve is moved into open position.

2. A device of the class described, comprising a casing having a chamber with an upwardly opening inlet and a laterally opening outlet and with a downwardly opening leakage passage, valves operatively controlling each of said inlet and outlet openings and said passage, a member connecting said inlet valve and said passage valve whereby the closing of said passage valve effects the opening of said inlet, and means operable by the closing movement of said passage valve to effect the opening of said outlet valve, said inlet and outlet valves being operable to close said inlet and outlet openings respectively when said passage valve is moved into open position.

3. A device of the class described, comprising a chambered casing having an inlet opening and an oppositely positioned leakage passage and having an outlet opening, a valve controlling said inlet opening, a valve controlling said leakage passage, a member attached to said passage valve having axially movable engagement with said inlet valve whereby said inlet valve is opened by the operation of closing said passage valve, said inlet valve being thereby moved from its seat after the closure of said leakage passage and reversely being seated before the opening of said leakage passage, a valve controlling said outlet opening, and means operable by said passage valve to effect the opening of said outlet valve by the closing of said passage valve and to permit the closing of said outlet valve by the opening of said passage valve.

4. A device of the class described, comprising a chambered casing having an inlet opening and an oppositely positioned leakage passage and having an outlet opening, valves controlling each of said openings and said passage respectively, a member operatively connecting said passage valve and said inlet valve having provision for lost motion in relation to one of said valves, and a pivoted member operatively engaging said passage valve and said outlet valve, the closing movement of said passage valve effecting the opening of said inlet and outlet valves, and the opening movement of said passage valve permitting the closing of said inlet and outlet valves.

5. A device of the class described, comprising a chambered casing having an inlet opening and an outlet opening and a leakage passage positioned oppositely of said inlet opening, valves controlling each of said openings and said passage respectively, a rod attached to said passage valve and adapted to operatively engage said inlet valve to open the latter with the closing movement of said passage valve, and a bell crank pivotally supported with one arm positioned for engagement by said passage valve and the other arm positioned for engagement with said outlet valve whereby said outlet valve is opened by the closing movement of said passage valve.

In witness whereof I have hereunto attached my signature.

OLAF LARSEN.